United States Patent
Sullivan (10) Patent No.: US 9,964,307 B2
(45) Date of Patent: May 8, 2018

(54) INTERFACE HEAT SHIELD FOR A COMBUSTOR OF A GAS TURBINE ENGINE

(71) Applicant: United Technologies Corporation, Hartford, CT (US)

(72) Inventor: Dennis J. Sullivan, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 129 days.

(21) Appl. No.: 14/432,433

(22) PCT Filed: Sep. 30, 2013

(86) PCT No.: PCT/US2013/062660
§ 371 (c)(1),
(2) Date: Mar. 30, 2015

(87) PCT Pub. No.: WO2014/052965
PCT Pub. Date: Apr. 3, 2014

(65) Prior Publication Data
US 2015/0260404 A1    Sep. 17, 2015

Related U.S. Application Data

(60) Provisional application No. 61/707,998, filed on Sep. 30, 2012.

(51) Int. Cl.
*F02C 1/00* (2006.01)
*F23R 3/00* (2006.01)
*F23R 3/50* (2006.01)
*F23R 3/48* (2006.01)
*F23R 3/10* (2006.01)

(52) U.S. Cl.
CPC .............. *F23R 3/005* (2013.01); *F23R 3/002* (2013.01); *F23R 3/007* (2013.01); *F23R 3/10* (2013.01); *F23R 3/48* (2013.01); *F23R 3/50* (2013.01); *F23R 2900/00012* (2013.01); *F23R 2900/03042* (2013.01); *F23R 2900/03044* (2013.01); *Y02T 50/675* (2013.01)

(58) Field of Classification Search
CPC .. F23R 3/002; F23R 3/283; F23R 3/10; F23R 2900/03041; F23R 2900/03042
See application file for complete search history.

(56) References Cited

U.S. PATENT DOCUMENTS

| | | | | |
|---|---|---|---|---|
| 4,085,581 A | * | 4/1978 | Caruel | F23R 3/10 60/738 |
| 4,567,730 A | * | 2/1986 | Scott | F23R 3/007 60/752 |
| 4,914,918 A | | 4/1990 | Sullivan | |
| 5,253,471 A | * | 10/1993 | Richardson | F23R 3/002 60/754 |
| 5,285,632 A | | 2/1994 | Halila | |
| 5,323,601 A | * | 6/1994 | Jarrell | F23R 3/002 60/752 |
| 5,542,246 A | * | 8/1996 | Johnson | F23R 3/10 60/755 |

(Continued)

OTHER PUBLICATIONS

EP search report for EP13841391.9 dated Jun. 8, 2016.

*Primary Examiner* — Gerald L Sung
(74) *Attorney, Agent, or Firm* — O'Shea Getz P.C.

(57) ABSTRACT

A combustor for a gas turbine engine includes an interface shield between a first heat shield and a second heat shield.

20 Claims, 8 Drawing Sheets

(56) References Cited

U.S. PATENT DOCUMENTS

| | | |
|---|---|---|
| 6,497,105 B1 | 12/2002 | Stastny |
| 2002/0116929 A1* | 8/2002 | Snyder .................... F23R 3/002 60/740 |
| 2003/0213249 A1 | 11/2003 | Pacheco-Tougas et al. |
| 2005/0081527 A1 | 4/2005 | Howell et al. |
| 2009/0293488 A1 | 12/2009 | Coughlan et al. |
| 2011/0088402 A1* | 4/2011 | Commaret .............. F23R 3/283 60/755 |

* cited by examiner

INTERFACE HEAT SHIELD FOR A COMBUSTOR OF A GAS TURBINE ENGINE

Applicant hereby claims priority to PCT Patent Application No. PCT/US13/062660 filed Sep. 30, 2013, which claims priority to U.S. Patent Application No. 61/707,998 filed Sep. 30, 2012, the disclosures of which are herein incorporated by reference.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases. A typical combustor section includes a shell lined with heat shields often referred to as Impingement Film Float (IFF) wall panels. Dilution holes in the heat shields are aligned with dilution holes in the shell to introduce combustion or dilution air. In addition to the dilution holes, the shell may also include numerous air impingement holes to direct cooling air between the support shell and the heat shields to cool the backside of the heat shields. This cooling air exits numerous effusion holes in the heat shields to form a cooling film on the hot side thereof.

The forward section of the combustor includes a bulkhead through which fuel nozzles extend. Over prolonged operational time, edges of the bulkhead heat shield may crack in the high temperature environment. If the bulkhead heat shield cracks, cooling air may leak and may not effectively accomplish the desired cooling.

SUMMARY

A combustor for a gas turbine engine according to one disclosed non-limiting embodiment of the present disclosure includes a first heat shield, a second heat shield and an interface shield between the first heat shield and the second heat shield.

In a further embodiment of the foregoing embodiment, the first heat shield is generally rectilinear.

In a further embodiment of any of the foregoing embodiments, the first heat shield extends axially with respect to a fuel nozzle which defines a nozzle axis. In the alternative or additionally thereto, the second heat shield is transverse to the nozzle axis. In the alternative or additionally thereto, the second heat shield is transverse to the first heat shield. In the alternative or additionally thereto, the nozzle axis extends through the second heat shield.

In a further embodiment of any of the foregoing embodiments, the interface shield is generally "L" shaped in cross-section.

In a further embodiment of any of the foregoing embodiments, the interface shield is located in an upstream corner of a combustion chamber of the combustor.

In a further embodiment of any of the foregoing embodiments, the interface shield is trapped by the second heat shield and the first heat shield.

In a further embodiment of any of the foregoing embodiments, the first heat shield defines an upstream section with a first thickness and a downstream section with a second thickness, the first thickness greater than the second thickness.

In a further embodiment of any of the foregoing embodiments, the first heat shield defines an upstream section with a multiple of apertures therethrough.

A combustor for a gas turbine engine according to another disclosed non-limiting embodiment of the present disclosure includes a heat shield, a bulkhead heat shield transverse to the heat shield, and an interface shield between the heat shield and the bulkhead heat shield.

In a further embodiment of the foregoing embodiment, the interface shield is generally "L" shaped in cross-section. In the alternative or additionally thereto, the interface shield is located in an upstream corner of a combustion chamber of the combustor. In the alternative or additionally thereto, the interface shield is trapped by the heat shield and the bulkhead heat shield. In the alternative or additionally thereto, the heat shield defines an upstream section with a first thickness and a downstream section with a second thickness, the first thickness greater than the second thickness.

In a further embodiment of any of the foregoing embodiments, the bulkhead heat shield includes a multiple of apertures therethrough, the multiple of apertures directed toward the heat shield.

A combustor for a gas turbine engine according to another disclosed non-limiting embodiment of the present disclosure includes a fuel nozzle which defines a nozzle axis, a bulkhead heat shield through which the nozzle axis passes, and an interface shield adjacent to the bulkhead heat shield.

In a further embodiment of the foregoing embodiment, the interface shield abuts a cold side of the bulkhead heat shield and a support shell.

In a further embodiment of any of the foregoing embodiments, the combustor includes a heat shield transverse to the bulkhead heat shield.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
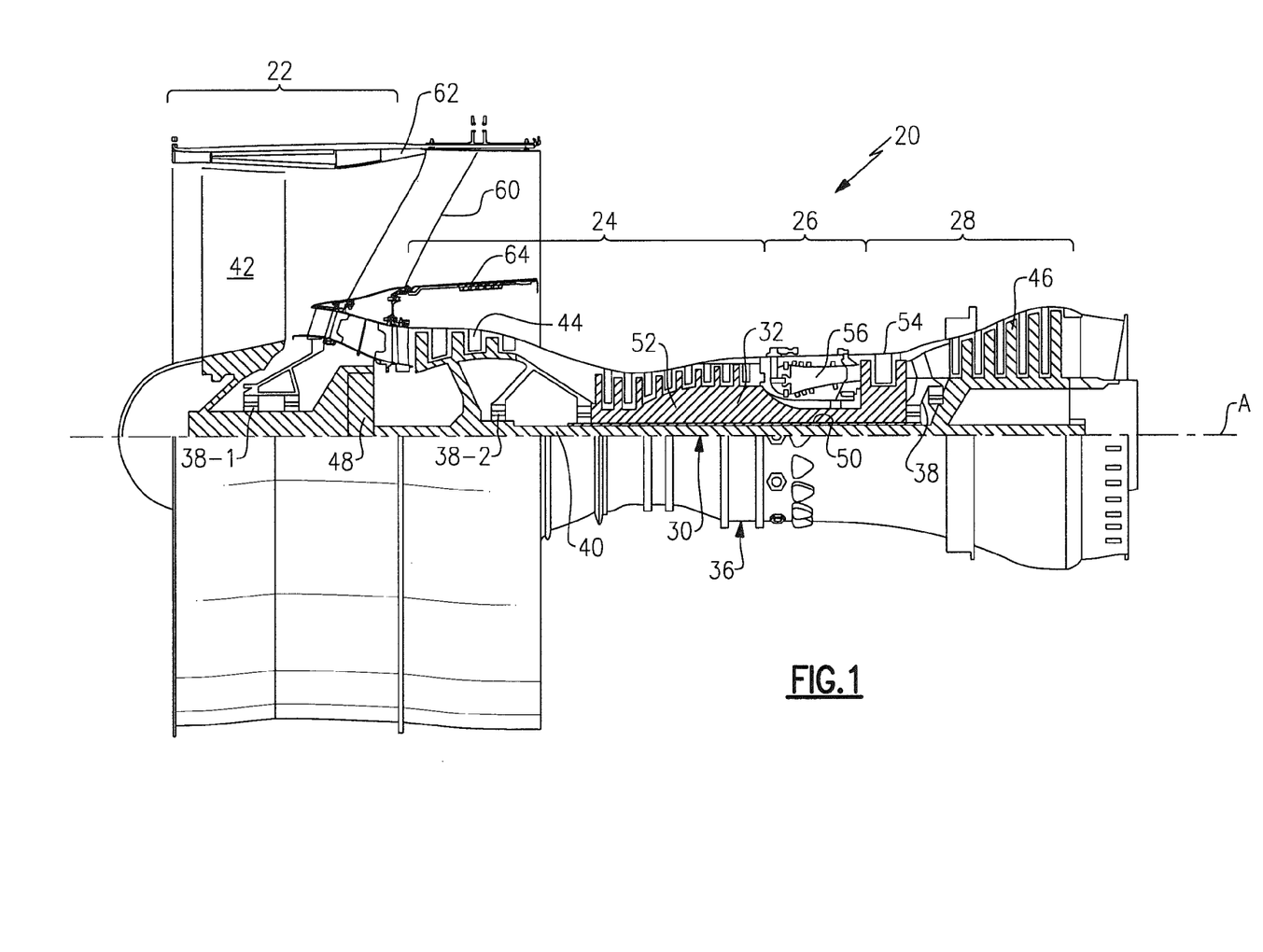
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/$518.7^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
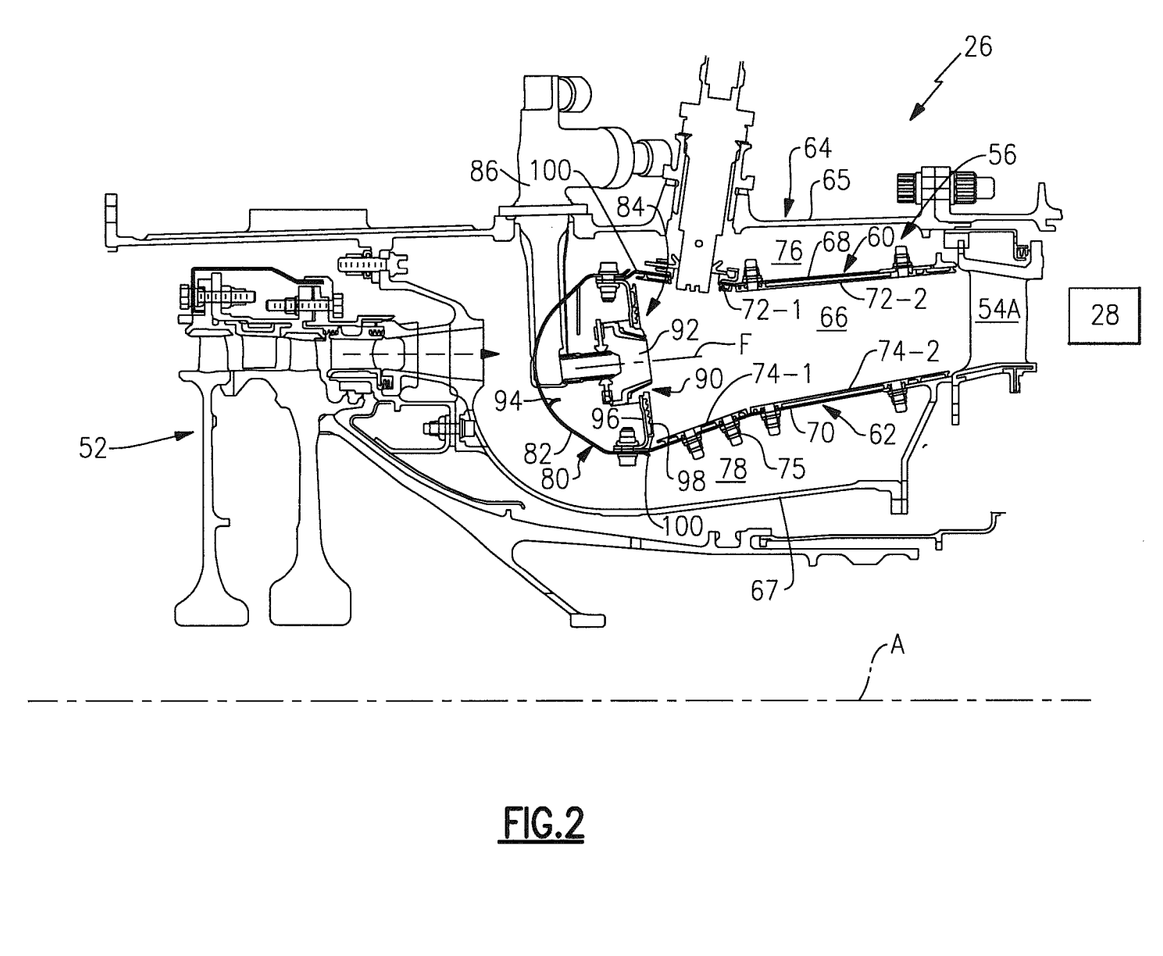
FIG. 2 is a partial longitudinal schematic sectional view of a combustor section according to one non-limiting embodiment that may be used with the gas turbine engine shown in FIG. 1.

With reference to FIG. 2, the combustor 56 generally includes an outer liner 60, and an inner liner 62 located within a diffuser case module 64. The outer liner 60 and the inner liner 62 are spaced apart such that a combustion chamber 66 is defined therebetween. The combustion chamber 66 is generally annular in shape. The outer liner 60 is spaced radially inward from an outer diffuser case 65 of the diffuser case module 64 to define an annular outer plenum 76. The inner liner 62 is spaced radially outward from an inner diffuser case 67 of the diffuser case module 64 to define an annular inner plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The liners 60, 62 contain the combustion products for direction toward the turbine section 28. Each liner 60, 62 generally includes a respective support shell 68, 70 which supports one or more heat shields 72, 74 which are attached to a hot side of the respective support shell 68, 70 with fasteners 75 such as with studs and nuts. The heat shields 72, 74, often referred to as Impingement Film Float (IFF) wall panels define a generally rectilinear array which define the annular combustor chamber 66. Each of the heat shields 72, 74 may be generally rectilinear and manufactured of, for example, a nickel based super alloy, ceramic or other temperature resistant material. In one disclosed non-limiting embodiment, the array includes a multiple of forward heat shields 72-1 and a multiple of aft heat shields 72-2 that line the hot side of the outer support shell 68 and a multiple of forward heat shields 74-1 and a multiple of aft heat shields 74-2 that line the hot side of the inner support shell 70.

Figure 3:
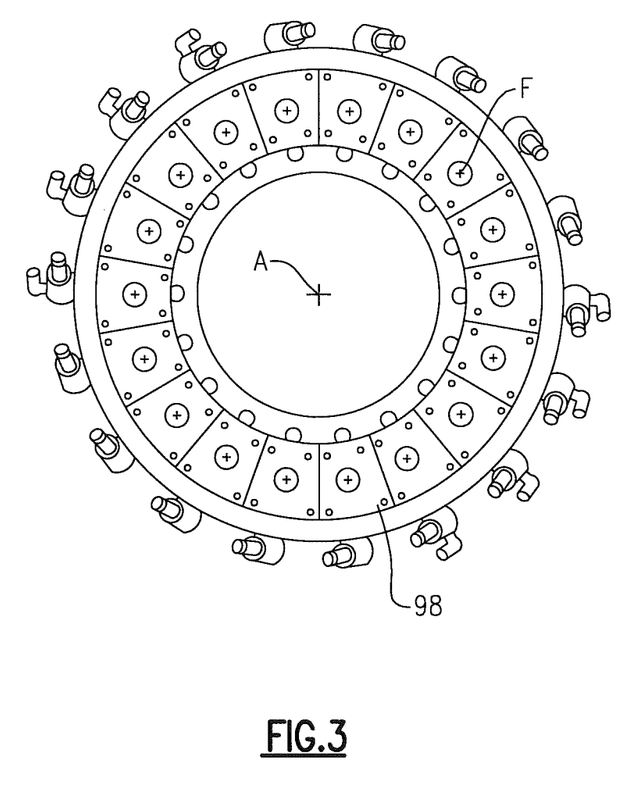
FIG. 3 is a sectional view looking forward toward the fuel injectors of the combustor.

The combustor 56 also includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the liners 60, 62, and a multiple of circumferentially distributed bulkhead heat shields 98 secured to the bulkhead support shell 96 around the central opening 92 (FIG. 3).

The annular hood 82 extends radially between, and is secured to, the forwardmost ends of the liners 60, 62. The annular hood 82 includes a multiple of circumferentially distributed hood ports 94 that accommodate the respective fuel nozzle 86 which introduces air and fuel into the forward end of the combustion chamber 66 at a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward end of the combustion chamber 66 while the remainder enters the annular outer plenum 76 and the annular inner plenum 78. The multiple of fuel nozzles 86 and surrounding structure generate a blended fuel-air mixture that supports combustion in the combustion chamber 66.

Opposite the forward assembly 80, the outer and inner support shells 68, 70 are mounted to a first row of Nozzle Guide Vanes (NGVs) 54A in the HPT 54. In one disclosed non-limiting embodiment, thirty-two (32) NGVs 54A are located immediately downstream of the combustor 56 as the first static vane structure upstream of a first turbine rotor in the turbine section 28. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
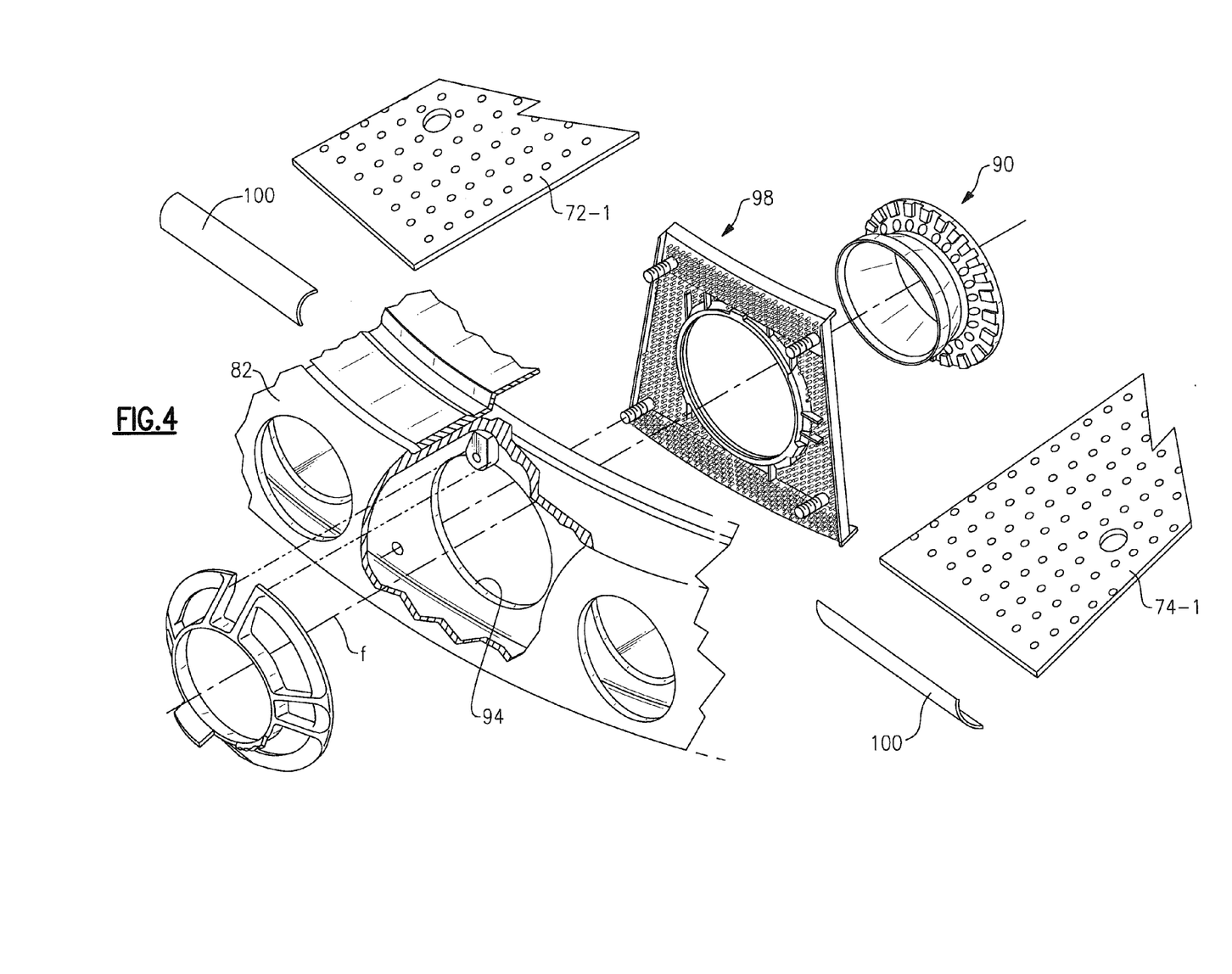
FIG. 4 is an exploded view of a forward assembly of the combustor.
Figure 5:
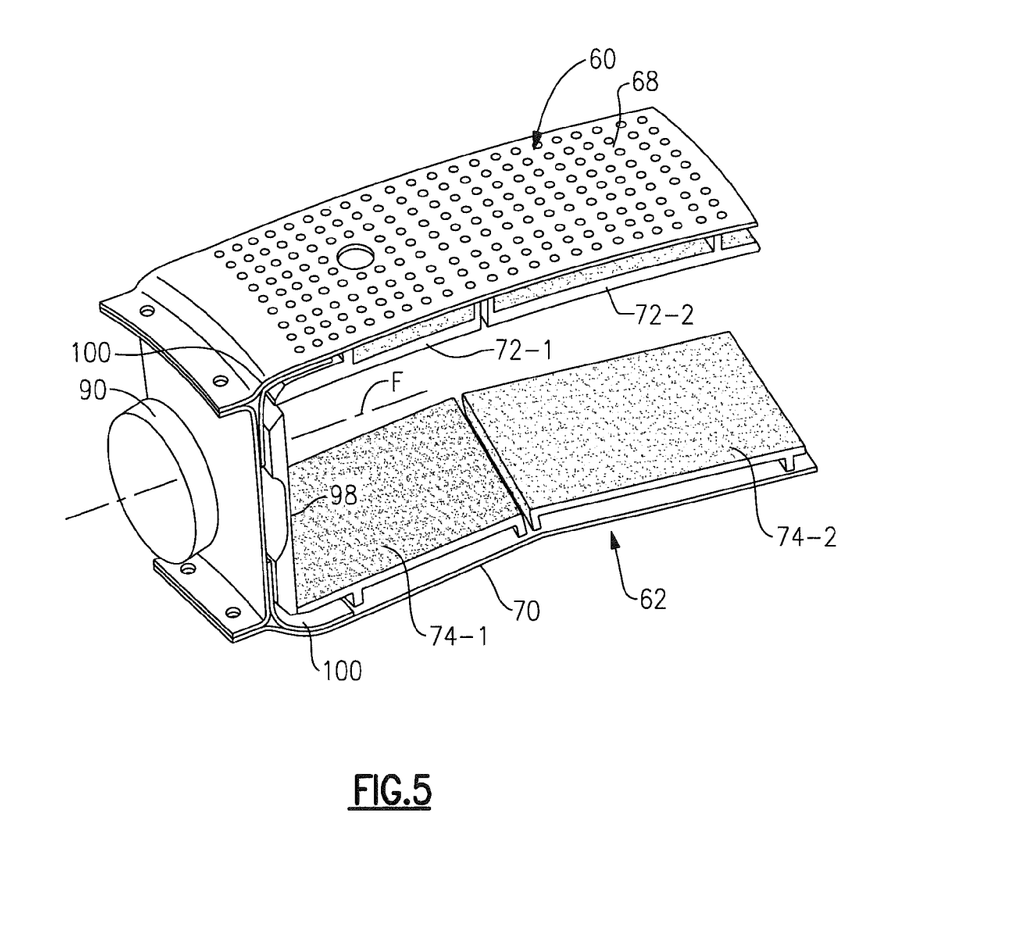
FIG. 5 is a schematic view of a circumferential portion of the combustor.

With reference to FIG. 4, the bulkhead heat shields 98 are transverse to axis F while the heat shields 72, 74 are generally parallel thereto (FIG. 5). A generally rectilinear section of the combustion chamber 66 may thereby be defined for each of the multiple of fuel nozzles 86. It should be understood that any number of bulkhead heat shields 98 may be associated with any number of heat shields 72, 74.

An interface shield 100 is located at an upstream corner defined between each of the bulkhead heat shields 98 and the respective heat shields 72, 74. Each interface shield 100 may be generally "L" or "angle iron" shaped in cross-section to isolate the bolted joint adjacent to the intersection of the heat shields 72, 74, and the bulkhead heat shields 98. The interface shield 100 may be manufactured of a sheet metal, ceramic material or other heat resistant material to abut a cold side of the heat shields 72, 74 and the bulkhead heat shields 98. In other words, the interfaced shield 100 is located at an interface between the heat shields 72, 74 and the bulkhead heat shields 98 (FIG. 6).

Figure 6:
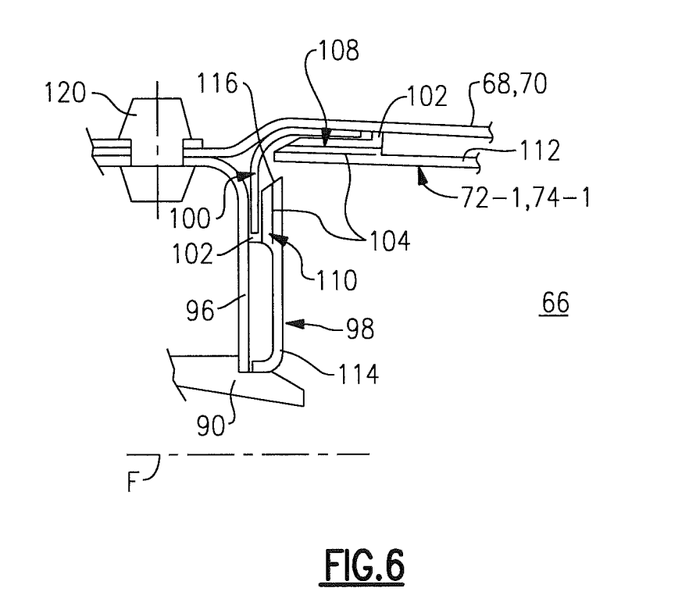
FIG. 6 is an expanded schematic view of an upstream corner of the combustor according to one non-limiting embodiment.

With reference to FIG. 6, the heat shields 72, 74 and bulkhead heat shields 98 may generally include a rail 102 to abut the respective shell 68, 70. The rail 102 abuts the bulkhead support shell 96 so as to position and restrain the interface shield 100. A longitudinally upstream section 108 of the heat shields 72-1, 74-1 and a radially outboard section 110 of the bulkhead heat shields 98 may further include a respective increased thickness end section 104 inboard of the rail 102 to further restrain and position the interface shield 100. That is, the longitudinally upstream section 108 of the heat shields 72-1, 74-1 define a thickness greater than a thickness of a downstream section 112 of the heat shields 72-1, 74-1 and the radially outboard section 110 of the bulkhead heat shields 98 defines a thickness greater than a thickness of an inboard section 114 of the bulkhead heat shields 98.

A multiple of apertures 116 such as slots may be located in the longitudinally upstream section 108 of the heat shields 72-1, 74-1 and the radially outboard section 110 of the bulkhead heat shields 98 to direct cooling air. The multiple of apertures 116 facilitate convection cooling of the longitudinally upstream section 108 and the radially outboard section 110 as well as provide a communication path for cooling air to the interface shield 100. That is, cooling air may be communicated through the shells 68, 70 and bulkhead support shell 96; behind the heat shields 72-1, 74-1, and the bulkhead heat shields 98; and through the apertures 116 to generate a controlled cooling film onto the interface shield 100.

Figure 7:
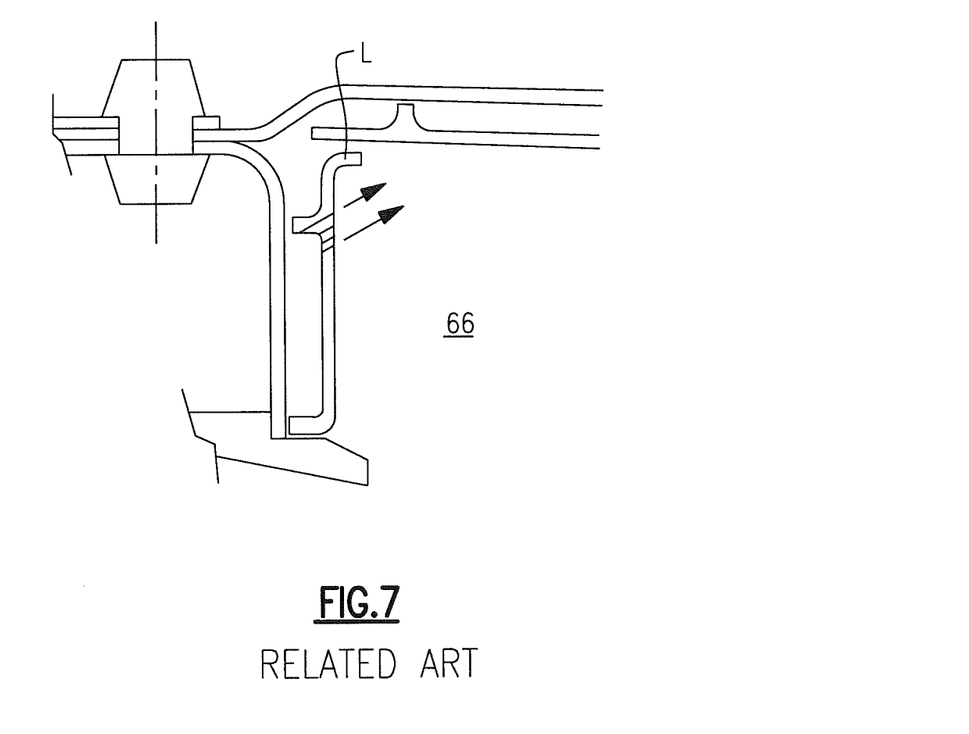
FIG. 7 is an expanded schematic view of a RELATED ART upstream corner of a combustor.

The interface shield 100 facilitates directional control of the cooling airflow that enters the combustion chamber 66 at the intersection of the heat shields 72-1, 74-1 and the bulkhead heat shields 98; provides a seal to block uncontrolled leakage through the bolted interface 120 between the shells 68, 70, bulkhead support shell 98, and the annular hood 82; and increases sealing relative to a conventional bulkhead lip L (Related Art; FIG. 7).

Figure 8:
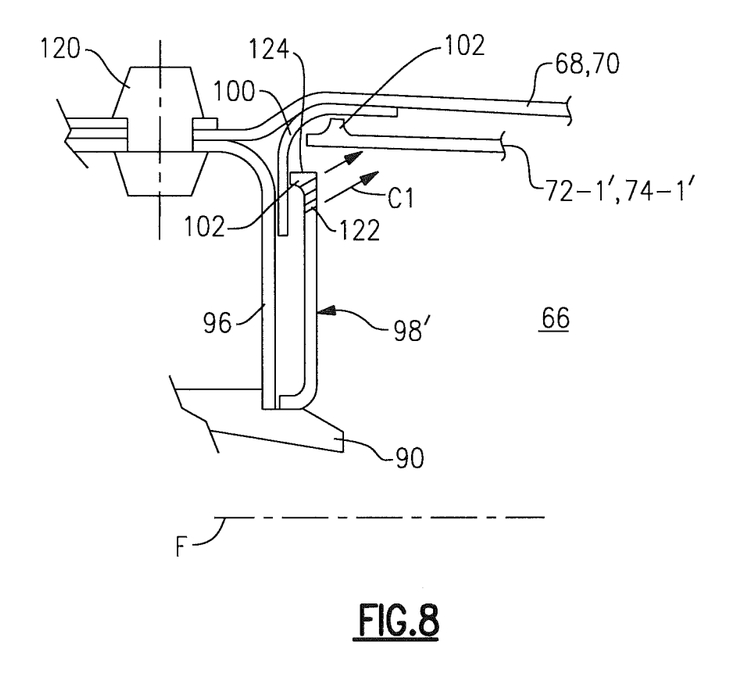
FIG. 8 is an expanded schematic view of an upstream corner of the combustor according to another non-limiting embodiment.

With reference to FIG. 8, another disclosed non-limiting embodiment, utilizes the rails 102 to trap the interface shield 100 against the respective shell 68, 70 and bulkhead support shell 96. A multiple of apertures 122 are located through the bulkhead heat shields 98' to direct a cooling airflow $C_1$ toward an adjacent heat shield 72-1', 74-1'. That is, the multiple of apertures 122 are angled or otherwise directed with respect to a hot side of the bulkhead heat shields 98'. The interface shield 100 facilities the location of the multiple of apertures 120 close to an edge 124 of the bulkhead heat shields 98' to increase combustor durability as a conventional bulkhead lip L (Related Art; FIG. 7) is avoided.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor for a gas turbine engine comprising:
an inner liner;
an outer liner;
a dome connecting the inner liner and the outer liner;

a liner heat shield that is one of: spaced radially inward of the outer liner or spaced radially outward of the inner liner;
a bulkhead heat shield spaced axially downstream of the dome; and
an interface shield that is located axially aft of the dome and is one of: located radially inward of the outer liner or located radially outward of the inner liner;
wherein the interface shield is configured to be constrained between the dome and the bulkhead heat shield,
wherein the interface shield is configured to be constrained between the liner heat shield and one of the inner liner or the outer liner,
wherein a first surface of the liner heat shield is opposed to a second surface of the liner heat shield, the second surface of the liner heat shield forming a combustion chamber boundary, and
wherein the interface shield abuts the first surface of the liner heat shield such that at least a portion of the interface shield is disposed between the first surface of the liner heat shield and one of the inner liner or the outer liner.

2. The combustor as recited in claim 1, wherein the liner heat shield is generally rectilinear.

3. The combustor as recited in claim 1, wherein the liner heat shield extends axially with respect to a fuel nozzle which defines a nozzle axis.

4. The combustor as recited in claim 3, wherein the bulkhead heat shield is transverse to the nozzle axis.

5. The combustor as recited in claim 3, wherein the bulkhead heat shield is transverse to the liner heat shield.

6. The combustor as recited in claim 3, wherein the nozzle axis extends through said bulkhead heat shield.

7. The combustor as recited in claim 1, wherein a cross sectional profile of the interface shield is generally "L" shaped.

8. The combustor as recited in claim 1, wherein the bulkhead heat shield is transverse to the liner heat shield, and wherein the interface shield is located at an interface between the liner heat shield and the bulkhead heat shield.

9. The combustor as recited in claim 1, wherein the interface shield is between the bulkhead heat shield and the liner heat shield.

10. The combustor as recited in claim 1, wherein the liner heat shield defines an upstream section with a first thickness and a downstream section with a second thickness, the first thickness greater than the second thickness.

11. The combustor as recited in claim 1, wherein the liner heat shield defines an upstream section with a multiple of apertures therethrough.

12. The combustor as recited in claim 1, wherein the bulkhead heat shield includes a multiple of apertures therethrough, the multiple of apertures directed toward the liner heat shield.

13. The combustor as recited in claim 1, wherein an axially aft surface of the bulkhead heat shield is opposed to an axially forward surface of the bulkhead heat shield, the axially aft surface of the bulkhead heat shield forming a second combustion chamber boundary, and wherein the interface shield abuts the axially forward surface of the bulkhead heat shield such that at least a portion of the interface shield is axially forward of the axially forward surface of the bulkhead heat shield.

14. The combustor as recited in claim 1, wherein the liner heat shield is spaced radially inward of the outer liner, and wherein the interface shield is located radially inward of the outer liner, and wherein the interface shield is configured to be constrained between the liner heat shield and the outer liner, and wherein the at least a portion of the interface shield is disposed between the first surface of the liner heat shield and the outer liner.

15. The combustor as recited in claim 14, further comprising:
a second liner heat shield that is spaced radially outward of the inner liner, and
a second interface shield that is located axially aft of the dome and is located radially outward of the inner liner;
wherein the second interface shield is configured to be constrained between the dome and the bulkhead heat shield,
wherein the second interface shield is configured to be constrained between the second liner heat shield and the inner liner,
wherein a first surface of the second liner heat shield is opposed to a second surface of the second liner heat shield, the second surface of the second liner heat shield forming a second combustion chamber boundary, the combustion chamber boundary and the second combustion chamber boundary forming boundaries of an annular combustion chamber, and
wherein the second interface shield abuts the first surface of the second liner heat shield such that at least a portion of the second interface shield is disposed between the first surface of the second liner heat shield and the inner liner.

16. A combustor for a gas turbine engine comprising:
an inner liner;
an outer liner;
a dome connecting the inner liner and the outer liner;
a first liner heat shield spaced radially inward of the outer liner;
a second liner heat shield spaced radially outward of the inner liner;
a first interface shield located radially inward of the outer liner and axially aft of the dome;
a second interface shield located radially outward of the inner liner and axially aft of the dome; and
a bulkhead heat shield transverse to the first liner heat shield and the second liner heat shield;
wherein the first interface shield is constrained between the dome and the bulkhead heat shield,
wherein the first interface shield is constrained between the outer liner and the first liner heat shield,
wherein the second interface shield is constrained between the dome and the bulkhead heat shield, and
wherein the second interface shield is constrained between the inner liner and the second liner heat shield.

17. The combustor as recited in claim 16, wherein the first interface shield is located in a corner of a combustion chamber of the combustor.

18. The combustor as recited in claim 16, wherein the first liner heat shield defines an upstream section with a first thickness and a downstream section with a second thickness, the first thickness greater than the second thickness.

19. A combustor section for a gas turbine engine comprising:
a fuel nozzle which defines a nozzle axis;
an inner liner;
an outer liner;
a dome connecting the inner liner and the outer liner;
a bulkhead heat shield through which the nozzle axis passes, the bulkhead heat shield spaced axially downstream of the dome;

a first liner heat shield transverse to the bulkhead heat shield and spaced radially inward of the outer liner;

a second liner heat shield spaced radially outward of the inner liner;

a first interface shield located axially aft of the dome and radially inward of the outer liner; and a second interface shield located axially aft of the dome and radially outward of the inner liner, wherein a radially outer surface of the first liner heat shield is opposed to a radially inner surface of the first liner heat shield, the radially inner surface of the first liner heat shield forming a combustion chamber boundary, wherein the first interface shield abuts the radially outer surface of the first liner heat shield such that at least a portion of the first interface shield is radially outward of the radially outer surface of the first liner heat shield, wherein the first interface shield is constrained between the dome and the bulkhead heat shield, wherein the first interface shield is constrained between the outer liner and the first liner heat shield, wherein the second interface shield is constrained between the dome and the bulkhead heat shield, and wherein the second interface shield is constrained between the inner liner and the second liner heat shield.

20. The combustor section as recited in claim 19, wherein the first interface shield abuts a support shell of the outer liner.

* * * * *